Figure 1:
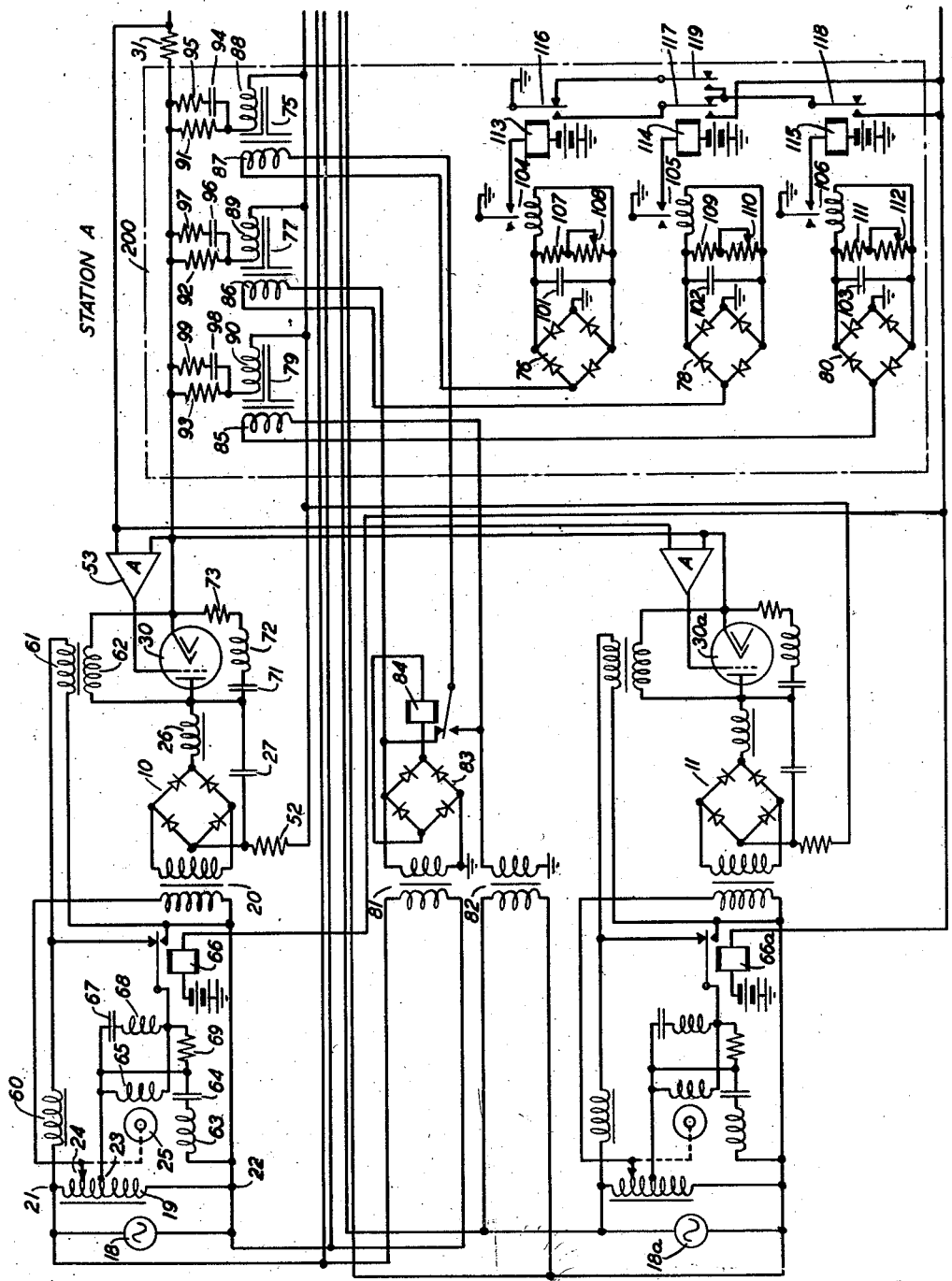

INVENTOR
J. K. MILLS
BY
G. F. Heuerman
ATTORNEY

July 2, 1957 J. K. MILLS 2,798,167
CURRENT SUPPLY APPARATUS
Filed Jan. 5, 1955 3 Sheets-Sheet 2

INVENTOR
J. K. MILLS
BY
G. F. Heuerman
ATTORNEY

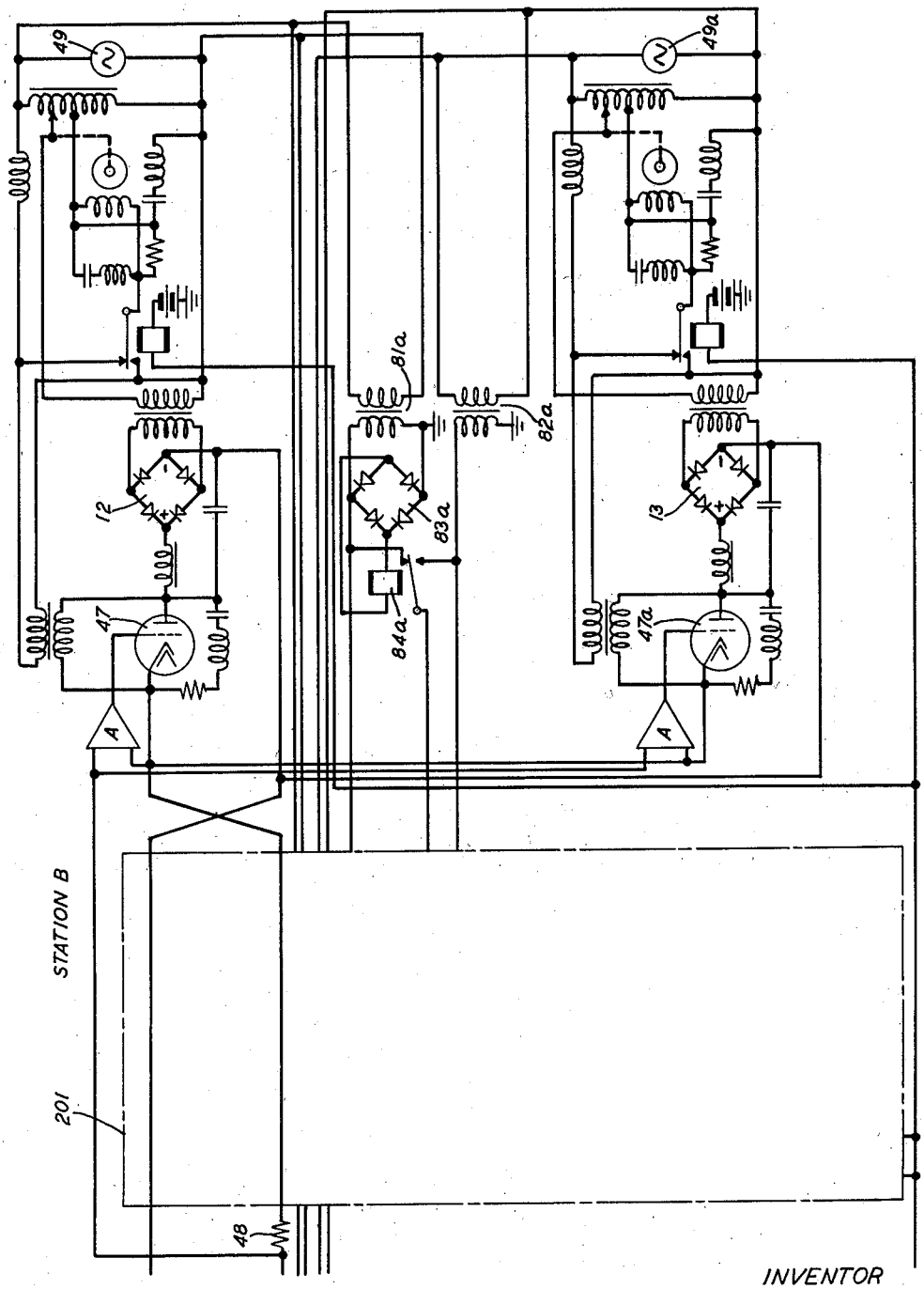

United States Patent Office 2,798,167
Patented July 2, 1957

2,798,167
CURRENT SUPPLY APPARATUS

John K. Mills, Morristown, N. J., assignor to Bell Telephone Laboratories, Incorporated, New York, N. Y., a corporation of New York Application January 5, 1955, Serial No. 480,011

5 Claims. (Cl. 307—81)

This invention relates to current supply apparatus and particularly to apparatus for controlling the voltage impressed upon and the current supplied to a submarine telephone cable for energizing spaced repeaters which are provided in the cable signal transmission path.

An object of the invention is to provide improved means for controlling the current supplied to a load such as a repeatered submarine cable.

This invention is an improvement over the current controlling apparatus for a repeatered cable disclosed in United States Patent No. 2,624,036 to H. H. Spencer, December 30, 1952.

In a proposed submarine repeatered telephone cable, a direct current having an amplitude between 0.225 and 0.245 ampere is required to be transmitted over the center conductor of the coaxial conductor cable for energizing spaced telephone repeaters embedded in the cable. It is important to maintain the direct energizing current continuously at a substantially constant amplitude in order that the thermionic tubes in the repeaters may have a maximum useful life. The supply of excessive current over the cable and current interruptions are especially to be avoided. Two supply sources are provided at each terminal of the cable for supplying substantially equal currents to the cable, about 2000 to 2500 volts positive with respect to ground being impressed upon the center conductor of the cable at one end and a negative potential of about the same magnitude with respect to ground being impressed upon the cable conductor at its other end. Voltages of either polarity which may occasionally be as high as 1000 volts are also introduced into the cable circuit due to earth potentials.

In a preferred embodiment of the invention, at each end of the cable, current is supplied from two direct-current sources in parallel so that, if a fault should develop in one of the current sources, the repeatered cable may be energized from the other of the two sources at one end of the cable and also, of course, from one or both supply sources at the opposite cable terminal. Each current supply source comprises a rectifier for supplying current through the space current path of a space current device, or a plurality of such devices in parallel, to the cable and a supply source of alternating current connected to the input of the rectifier. To minimize changes of current transmitted over the cable, the conductance of the space current device is controlled in response to changes of cable current and the alternating voltage impressed upon the rectifier input is controlled in response to changes of voltage drop across the space current path of the space current device.

To protect the cable from excessive voltage or current and at the same time avoiding current interruption or an unnecessarily large reduction of cable current, there is provided at each end of the cable protective apparatus comprising a first group of three relays each designed to operate when the voltage across the cable input increases to a predetermined voltage above the nomal range of operating voltages. The protective apparatus at each end of the cable also comprises a second group of three relays each of which is adjusted to operate when the cable current increases to a predetermined amplitude above the normal operating current range. Magnetic amplifiers are provided for isolating the relays from the high potential side of the current supply circuit and for reducing the shunt current drain on the supply circuit. At either end of the cable, the alternating voltage impressed upon each rectifier supplying the cable current is reduced in response to the operation of two at least of the relays of either group or of both groups of relays at that end of the cable, thereby reducing the cable current and voltage sufficiently to cause the operated relays to release.

Figure 2:
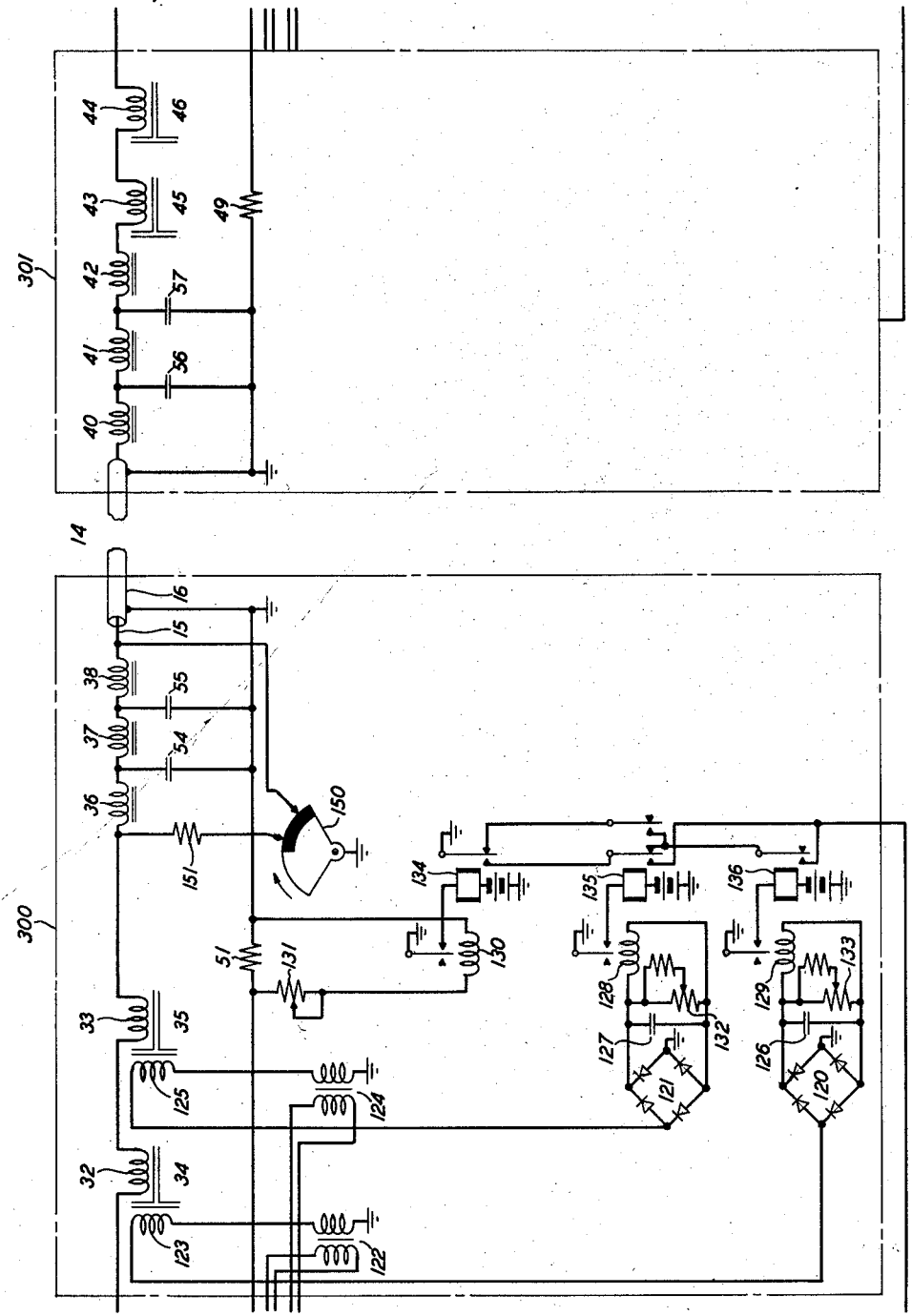

The invention may be better understood by referring to the following description and the accompanying drawing of which Figs. 1, 2 and 3 when placed side by side with Fig. 1 at the left and Fig. 3 at the right are a schematic view of a system for supplying energizing current to a repeatered submarine cable.

Referring now to the drawing, apparatus comprising rectifiers 10 and 11 at one terminal station A and rectifiers 12 and 13 at the other terminal station B is provided for supplying direct current to a submarine telephone cable 14 for energizing telephone repeaters embedded in the cable. The cable comprises a center conductor 15, a cylindrical conductor 16 coaxial with the center conductor, and the repeaters, not shown, embedded in the cable, for amplifying telephone signals transmitted over the cable. The rectifier 10 is coupled to a supply source of alternating current 18 through an autotransformer 19 and a two-winding transformer 20. Transformer 19 has a pair of end terminals 21 and 22, a mid terminal 23 and a variable tap or brush 24 which is mechanically coupled to the shaft of a two-phase motor 25 so that the variable tap will be driven in one direction or the other along the autotransformer winding as the motor turns to increase or decrease the alternating voltage between the variable tap 24 and the terminal 22. The terminals of the primary winding of transformer 20 are connected to terminals 22 and 24, respectively, of the autotransformer 19. The secondary winding of transformer 20 is connected to the input terminals of the bridge rectifier 10. To simplify the disclosure, a single bridge rectifier 10 is shown instead of a plurality of bridge rectifiers in series which are used to obtain the required voltage. A ripple filter comprising a series inductance element 26 and a shunt condenser 27 is connected to the output of rectifier 10. The positive output terminal of rectifier 10 is connected through the inductance element 26 to the anode of a regulator space current device 30. The cathode of the space current tube 30 is connected through a resistor 31, through control windings 32 and 33 of magnetic amplifiers 34 and 35, respectively, and through series inductance elements 36, 37 and 38 to the center conductor 15 of the repeatered submarine telephone cable. The current path continues over the center conductor of the cable and the telephone repeater equipment embedded in the cable to the other end of the cable at terminal station B. The circuit continues at station B through filter inductance elements 40, 41 and 42, like the elements 36, 37 and 38, through the control windings 43 and 44 of magnetic amplifiers 45 and 46, respectively, like the magnetic amplifiers 34 and 35, to the negative terminal of rectifier 12 and, from the positive terminal of rectifier 12, through the space current path of the regulator tube 47 and through resistors 48 and 49 to ground. The return current path is through the grounded conductor 16 and through resistors 51 and 52 at station A to the negative terminal of rectifier 10. The filter having the series inductance elements 36, 37 and 38 also comprises shunt condensers 54 and 55 and the filter having series inductance elements 40, 41 and 42 also comprises shunt condensers 56 and 57. These filters are provided for suppressing alternating components and thus preventing a rapid change of direct current through the cable circuit.

The voltage drop across resistor 31 at station A is amplified by amplifier 53, and the output voltage of the amplifier is impressed upon the control grid-cathode circuit of tube 30 so that, as the current supplied to the cable through resistor 31, for example, increases, the anode-cathode resistance of tube 20 increases and the voltage drop across the anode-cathode path increases to cause the current increase to be minimized. The voltage drop across the space current path of tube 47 at station B increases in response to an increase of current flowing through resistor 48, and vice versa, to tend to maintain the cable current constant.

An effective voltage which varies from time to time is introduced into the cable load circuit due to earth potentials. To maintain the load current substantially constant it is necessary to vary the voltage impressed upon the cable load circuit from the rectifiers 10, 11, 12 and 13 over a fairly wide range to compensate for the varying voltage which is introduced due to earth potentials. The variations of voltage drop across the space current path of each of tubes 30 and 47 are not always of sufficient magnitude to compensate for the voltage variations introduced into the load circuit due to earth potentials. Means are therefore provided, as described below, for controlling the alternating voltage supplied from the alternating voltage sources 18 and 18a to rectifiers 10 and 11, respectively, at station A in response to voltage changes across the space current paths of tubes 30 and 30a at station A and similar means are provided at station B.

A circuit may be traced from terminal 21 of autotransformer 19 through an inductance element 60 and through a winding 61 of a saturable inductance device to terminal 22 of the autotransformer. The saturable inductance device has a saturating winding 62 connected across the space current path of tube 30. As the resistance of the space current path of tube 30 and the voltage across it increase, for example, the current through saturating winding 62 also increases to cause the inductance of winding 61 to decrease. One winding 63 of motor 25 is connected in series with a condenser 64 across the half portion of autotransformer 19 between the terminals 21 and 23. The second winding 65 of motor 25 is in a current path connecting midtap 23 of the autotransformer and a common terminal of inductance device 60 and winding 61 of the saturable reactor, this path being normally completed through the armature and upper contact of a relay 66 when released. A filter comprising a condenser 67 and an inductance device 68 in series is provided across motor winding 65 to suppress third harmonic components of the power line frequency. A shunt resistor 69 is also connected across motor winding 65. A filter comprising a condenser 71, inductance element 72 and resistor 73 in series is provided across reactor winding 62 for suppressing alternating components which may be introduced into the reactor winding.

When the voltage drop across the anode-cathode path of tube 20 has a predetermined normal value, the inductance of winding 61 will be substantially equal to the inductance of the ballast reactor 60. For this condition the voltage between the fixed tap 23 of transformer 19 and the common terminal of reactor 60 and winding 61 will be substantially zero and no current will flow through the motor winding 65. When the voltage drop across the anode-cathode path of tube 30 increases or decreases with respect to the predetermined voltage, the motor winding 65 is energized to cause the motor 25 to drive the brush 24 in a direction to decrease the output voltage of the autotransformer in response to an increase of voltage drop across the tube 30 and in a direction to increase the output voltage in response to a decrease of voltage drop across tube 30. As will be decreased in detail below, means responsive to an abnormally high load voltage or current are provided for energizing the relay 66 to thereby complete a circuit for connecting motor winding 65 across the half portion of autotransformer 19 between terminal 22 and midtap 23. As a result, the motor drives the brush 24 in a direction to reduce the output voltage of autotransformer 19 until the load voltage or current have been reduced sufficiently to cause the relay 66 to release. The supply circuit comprising alternating-current supply source 18a, rectifier 11 and series regulator tube 30a is like the supply circuit which comprises alternating-current supply source 18, rectifier 10 and series regulator tube 30 and therefore need not be described further. Each of these supply circuits is normally controlled in response to the voltage drop across resistor 31. The supply circuit which comprises alternating-current source 18a, rectifier 11 and series tube 30a includes a relay 66a like the relay 66. The control circuit for relay 66 to be described also controls the relay 66a. The current supply circuit comprising the alternating-current source 49, rectifier 12 and series regulator tube 47 at station B is like the current supply source comprising alternating-current source 18, rectifier 10 and series regulator tube 30 at station A. The current supply source comprising alternating-current source 49a, rectifier 13 and series regulator tube 47a is like the current supply source comprising elements 49, 12 and 47, each of these sources being controlled in response to the voltage drop across resistor 48.

It will be noted that the current supply circuits at stations A and B are similar in that at each station the positive terminal of the rectifier is conductively connected to the anode of the series regulator tube and the cathode of this series regulator tube is conductively connected to a first terminal of the regulating resistor the voltage drop across which controls the current regulating apparatus. At station A, however, the negative rectifier terminal is connected to ground (through a resistance path) and a second terminal of the regulating resistor is connected to the center conductor of the cable whereas, at station B, the second terminal of the regulating resistor is connected to ground through a resistance path and the negative terminal of the rectifier is conductively connected to the center conductor of the cable.

Relay means responsive to a predetermined abnormally high voltage across the cable load circuit are provided at station A for causing the operation of relays 66 and 66a to reduce the voltage to the normal voltage range. Similar relay means are provided at station B. The relay means at station A includes the apparatus shown within the dash-dot enclosure 200. Similar apparatus is provided at station B within the dash-dot enclosure 201, a detailed showing of this apparatus being omitted to simplify the disclosure. These relay means will now be described.

There are provided at station A three magnetic amplifiers one comprising saturable inductor 75 and rectifier 76, a second comprising saturable inductor 77 and rectifier 78 and the third comprising saturable inductors 79 and rectifier 80. There are also provided for energizing the magnetic amplifiers at station A a transformer 81 having its primary connected to the alternating-current source 18, a transformer 82 having its primary connected to the alternating-current source 18a, an auxiliary rectifier 83 and a relay 84. The corresponding elements at station B are designated 81a, 82a, 83a and 84a, respectively. The alternating voltage from the secondary winding of transformer 82 is impressed upon a circuit comprising in series a winding 85 of saturable inductor 79 and the input of bridge rectifier 80. Current is supplied from the secondary winding of transformer 81 to a circuit comprising a winding 86 of reactor 77 and the input of rectifier 78 in series. Current is also supplied from the secondary winding of transformer 81 to auxiliary rectifier 83 which under normal operating conditions supplies current to relay 84 for causing it to operate. Current is supplied from the secondary winding of transformer 81 through an armature and contact of operated relay 84 to a circuit comprising in series a winding 87 of saturable inductor 75 and the input of rectifier 76. A failure of the current supply from the alternating-current source 18 causes relay 84 to release. As a result, the circuit comprising winding 87 of saturable inductor 75 and the input of rectifier 76 is disconnected from the secondary of transformer 81 and connected to the secondary of transformer 82. The reactors 75, 77 and 79 having saturating windings 88, 89 and 90, respectively, the energization of which controls the impedance of windings 87, 86 and 85, respectively, to control the currents supplied to rectifiers 76, 78 and 80, respectively. The windings 88, 89 and 90 are connected through resistors 91, 92 and 93, respectively, across the direct-current path going to the repeatered cable. The resistors 91, 92 and 93 are respectively shunted by series paths comprising condenser 94 and resistor 95, condenser 96 and resistor 97, and condenser 98 and resistor 99. Filtering condensers 101, 102 and 103 are connected across the output terminals of rectifiers 76, 78 and 80, respectively.

The windings of relays 104, 105 and 106 are connected to the output terminals of rectifiers 76, 78 and 80, respectively. There are connected across the windings of relays 104, 105 and 106, respectively, the shunt current paths comprising resistor 107 and rheostat 108 in series, resistor 109 and rheostat 110 in series and resistor 111 and rheostat 112 in series. When the direct voltage impressed upon the cable circuit increases to an abnormally high value, the currents in windings 88, 89 and 90, respectively, increase to reduce the impedance of windings 87, 86 and 85, respectively. The currents supplied to the windings of relays 104, 105 and 106, respectively, thus increase sufficiently to cause the operation of relays 104, 105 and 106. By means of rheostats 108, 110 and 112, the currents supplied to relays 104, 105 and 106, respectively, are adjusted so that each of the relays will normally operate when the voltage across the cable circuit reaches a predetermined excessively high value. There are provided three relays 113, 114 and 115 which are energized in response to the operation of relays 104, 105 and 106, respectively. Ground is supplied to relays 66 and 66a to complete operating circuits for these relays in response to the operation of two or three of relays 113, 114 and 115. If all three relays operate, or if relays 113 and 114 only operate, an energizing circuit is completed from ground through armature 116 and contact of relay 113 and through armature 117 and contact of relay 114 to the relays 66 and 66a and thence to grounded battery. If only relays 113 and 115 operate, ground is supplied to relays 66 and 66a through armature 116 and contact of relay 113, through armature 117 and contact of relay 14 and through armature 118 and contact of relay 115. If only relays 114 and 115 operate, ground is supplied to relay 66 and 66a through armature 116 and contact of relay 113, armature 119 and contact of relay 114 and through armature 118 and contact of relay 115. It is thus seen that if one only of relays 113, 114 and 115 operates, this operation is considered to be due to a defect in the relay means rather than to an excessive voltage across the cable load circuit. Therefore, the relays 66 and 66a are not operated in response to the operation of one only of relays 113, 114 and 115. At least two of the three relays must operate to effect the energization of relays 66 and 66a which then cause a reduction of the cable load voltage by lowering the currents supplied to rectifiers 10 and 11, respectively. The cable load voltage will be reduced to such an extent that relays 104, 105, 106, 113, 114 and 115 release. It will also be noted that failure of one of the alternating-current supply sources 18 or 18a will not prevent the energization of two of relays 113, 114 and 115 in response to an excessive cable load voltage since magnetic amplifier 75 and one of magnetic amplifiers 77 and 79 will be energized from that one of sources 18 and 18a which has not failed. The provision of the magnetic amplifiers comprising the saturable inductors 75, 77 and 79 serves the purpose of isolating the relays 104, 105 and 106 from the high voltage cable circuit and also of reducing considerably the current drain on the current supply circuits comprising the rectifiers 10 and 11.

There are also provided relay means responsive to abnormally high cable current for causing the operation of relays 66 and 66a to thereby reduce the current supplied to the cable circuit from rectifiers 10 and 11. This relay means at station A includes the apparatus shown within the dash-dot enclosure 300. Similar apparatus is provided at station B within the dash-dot enclosure 301, a detailed showing of this apparatus being omitted to simplify the disclosure. The cable current flows through the windings 32 and 33 in series of saturable inductors 34 and 35. These inductors are a part of magnetic amplifiers which also comprise rectifiers 120 and 121. Alternating current from supply source 18 is supplied through a transformer 122 and a winding 123 of inductor 34 to the input of rectifier 120. Current from the source 18a is supplied through a transformer 124 and the winding 125 of inductor 35 to the input of rectifier 121. Filtering condensers 126 and 127 are connected across the output terminals of rectifiers 120 and 121, respectively. Rectifier 121 supplies direct current to the winding of a relay 128 and rectifier 120 supplies direct current to the winding of a relay 129. The winding of a relay 130 similar to relays 128 and 129, is connected in series with a rheostat 131 across a resistor 51 in the grounded side of the cable current circuit. Rheostats 132 and 133 connected across winding 128 and 129, respectively, and rheostat 131 are adjusted so that each of relays 128, 129 and 130 will operate when the cable current increases to a predetermined amplitude above the normal operating cable current range. There are provided three relays 134, 135 and 136 which operate in response to the operation of relays 130, 128 and 129, respectively. The circuit associated with these relays is similar to the circuit associated with relays 113, 114 and 115. The operation of any two or all three of relays 134, 135 and 136 will cause relays 66 and 66a to operate thereby reducing the current supplied to the cable load to an amplitude which will cause relays 128, 129, 130, 134, 135 and 136 to release.

A manually operable switch 150 is provided for reducing the cable current in an emergency. A partial rotation of the switch connects the center conductor 15 of the cable through filter windings 36, 37 and 38 and through a resistor 151 to ground. A further rotation of the switch directly grounds the cable conductor 15. Operating the switch 150 at station A permits reduced current from rectifiers 12 and 13 at station B to be transmitted to the cable load.

What is claimed is:

1. In combination, means for supplying current from a current supply source to a load circuit, at least three relay means each coupled to said load circuit and each designed to operate when the voltage across said load circuit increases to a voltage greater than a predetermined voltage, and means responsive to the simultaneous operation of two at least of said relay means for reducing the voltage of said current supply source sufficiently to cause said operated relay means to release.

2. In combination, means for supplying current from a current supply source to a load circuit, at least three relay means each coupled to said load circuit and each adjusted to operate when the current supplied to said load circuit increases to a predetermined amplitude, and means responsive to the simultaneous operation of two at least of said relay means for reducing the current supplied to said load circuit sufficiently to cause said operated relay means to release.

3. In combination, a first and a second current supply source, a first and a second control means for controlling the supply of current from said supply sources, respectively, to a load circuit, three relay means each coupled to said load circuit and each designed to operate in response to an increase of voltage across said load circuit to a voltage greater than a predetermined voltage, each of said relay means requiring for operation the supply of current thereto in addition to the current supplied from said load circuit, means for supplying additional current from said first supply source to said first relay means, means for supplying additional current from said second supply source to each of said second and third relay means, means responsive to failure of said second supply source for causing additional current to be supplied from said first supply source to said third relay means, and means responsive to the simultaneous operation of two at least of said relay means for actuating said control means to reduce the current supplied to said load circuit.

4. In combination, means for supplying current from a supply source to a load circuit, a first, a second and a third relay, a first and a second magnetic amplifier for energizing said first and second relays, respectively, in response to current flowing in said load circuit, means for energizing said third relay directly by current in said load circuit, each of said relays being adjusted to operate in response to an increase of load current to a predetermined amplitude, and means responsive to the simultaneous operation of two at least of said relays for reducing the current in said load circuit below said predetermined amplitude.

5. In combination, a rectifier having an input and an output for rectifying current from an alternating-current supply source and for supplying the rectified current to a load circuit, variable current conducting means through which current is supplied from the rectifier output to the said load circuit, means responsive to the amplitude of the current in said load circuit for controlling the conductance of said variable conducting means, means responsive to the voltage across said variable current conducting means for controlling the alternating voltage from said supply source impressed upon the input of said rectifier, three relays similarly responsive to the energization of said load circuit, and means responsive to the simultaneous operation of two at least of said relays for further controlling the alternating voltage from said supply source impressed upon the input of said rectifier.

References Cited in the file of this patent
UNITED STATES PATENTS
2,018,348    Dijksterhuis   ---------- Oct. 22, 1935